United States Patent
Aono et al.

(10) Patent No.: US 8,613,537 B2
(45) Date of Patent: Dec. 24, 2013

(54) DISPLAY AND ILLUMINATION SYSTEM

(75) Inventors: Koji Aono, Tokyo (JP); Akihiro Shima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 13/083,629

(22) Filed: Apr. 11, 2011

(65) Prior Publication Data

US 2011/0292673 A1  Dec. 1, 2011

(30) Foreign Application Priority Data

May 28, 2010  (JP) .................................. 2010-123052

(51) Int. Cl.
*F21V 7/04* (2006.01)

(52) U.S. Cl.
USPC ............................. 362/553; 362/554; 362/559

(58) Field of Classification Search
USPC .......................................... 362/553, 554, 559
See application file for complete search history.

(56) References Cited

U.S. PATENT DOCUMENTS

| | | | | |
|---|---|---|---|---|
| 4,506,317 A * | 3/1985 | Duddy | ........................... | 362/396 |
| 5,161,874 A * | 11/1992 | Benes | ........................... | 362/552 |
| 6,195,477 B1 * | 2/2001 | Denuto et al. | .................. | 385/15 |
| 6,416,339 B1 * | 7/2002 | Snow et al. | .................... | 439/215 |
| 6,971,781 B2 * | 12/2005 | Guy | .............................. | 362/576 |
| 7,188,986 B1 * | 3/2007 | Harwood | ...................... | 362/559 |
| 7,530,828 B2 * | 5/2009 | Miyazono | ...................... | 439/232 |
| 7,935,175 B2 * | 5/2011 | Jang et al. | ........................... | 95/28 |
| 8,053,968 B2 * | 11/2011 | Woo et al. | ...................... | 313/498 |
| 8,186,845 B2 * | 5/2012 | Zheng | .............................. | 362/183 |
| 8,256,921 B2 * | 9/2012 | Crookham et al. | ............ | 362/242 |
| 2006/0056855 A1 | 3/2006 | Nakagawa et al. | | |

FOREIGN PATENT DOCUMENTS

| | | |
|---|---|---|
| CN | 201184541 Y | 1/2009 |
| JP | 2004-229273 A | 8/2004 |
| JP | 2005-71870 A | 3/2005 |
| JP | 2009-265960 A | 11/2009 |

OTHER PUBLICATIONS

State Intellectual Property Office of the People's Republic of China, Office Action in Chinese Patent Application No. 201110161343.2 (Dec. 13, 2012).

* cited by examiner

*Primary Examiner* — Jong-Suk (James) Lee
*Assistant Examiner* — Mark Tsidulko
(74) *Attorney, Agent, or Firm* — Leydig, Voit & Mayer, Ltd.

(57) ABSTRACT

A display and illumination system includes a light source section accommodating a light source; an optical fiber for transmitting light from the light source; a display illumination unit radiating light transmitted by the optical fiber; a light source module installed in the light source section, accommodating the light source, and optically connected to the optical fiber; a plug electrode installed in the light source module and supplying electric power to the light source; a convex portion on a first side of the light source module, engaging the optical fiber, and extracting light from the light source; and a concave portion located opposite the first side of the light source module and urging the convex portion toward the optical fiber with a constant force.

11 Claims, 6 Drawing Sheets

DISPLAY AND ILLUMINATION SYSTEM

BACKGROUND OF THE INVENTION

1. Field of the Invention

The present invention relates to a display and illumination system.

2. Background Art

In conventional traffic signals, street lights, or display and illumination systems on high places such as high buildings, light sources are installed in parts to radiate the light from display units or illumination units. As light sources in these cases, lamps or fluorescent lights are normally used. Recently, the use of LEDs (light emitting diodes) having a longer life in place of lamps or fluorescent lights has also increased.

However, whichever of these light sources is used, when these lamps or LEDs, which are light sources, are blown out, the light sources must be replaced.

For display and illumination systems having the light sources of the display units or illumination units in a high place, such as traffic signals, the replacing operation must be carried out at the high place. For example, in the case of traffic signals, the replacing operation of the light sources must be carried out after limiting traffic, and is cumbersome and troublesome. Also for example, in the case where the light sources of illumination units are installed in a high place of an inner wall or ceiling, such as illumination apparatuses in tunnels or buildings, the replacing operation of the light sources must be carried out after limiting traffic lanes in the tunnels or limiting passages in the buildings, and is cumbersome and troublesome as in the case of traffic signals.

Furthermore, in illumination apparatuses such as head lamps and tail lamps installed in a motor vehicle, the light sources are generally assembled in the lamp houses where lamps or the like are installed. Therefore, since the replacing operation of the light sources must be carried out after disassembling the lamp houses from the outside or the inside of the motor vehicle, this is also a cumbersome and troublesome operation.

Therefore, in conventional display and illumination systems, there has been known a system equipped with a light source for outputting laser beams, a surface emitting section for planerly spreading and emitting the light emitted from the light source, and optical fibers for guiding light from the light source to the surface emitting section (for example, refer to Japanese Patent Application Laid-Open No. 2009-265960). Since such a display and illumination system can install the light source and the light emitting section (the display unit and the illumination unit) in separate positions, maintenance operations such as the replacement of the light source can be facilitated.

Furthermore, as described in Japanese Patent Application Laid-Open No. 2009-265960, there has also been known an example of guiding light emitted from a light source using optical fibers, while using LEDs as the light source (for example, refer to Japanese Patent Application Laid-Open No. 2005-071870). What is described in Japanese Patent Application Laid-Open No. 2005-071870 is equipped with a semiconductor light emitting element, such as an LED, optical fibers extending to the illumination location (illumination unit), and an optical connector optically connecting one end of optical fibers to the semiconductor light emitting element. In such a display and illumination system, as in that described in Japanese Patent Application Laid-Open No. 2009-265960, the light source and the light emitting section (the display unit and the illumination unit) can be installed on separate positions, maintenance operations such as the replacement of the light source can be facilitated.

SUMMARY OF THE INVENTION

However, in the conventional display and illumination system described in Japanese Patent Application Laid-Open No. 2009-265960, laser beams from a laser light source are guided to optical fibers using a condenser lens. Therefore, when the light source is replaced at the time of occurrence of the abnormality of the light source, for accurately and effectively guiding laser beams from the laser light source to the optical fibers, the location relationship (optical axis) of the laser light source, the condenser lens, and one end of optical fibers must be accurately aligned, and there is a problem wherein the operation to adjust the optical axis requires a huge amount of labor and cumbersome procedures are required.

In the conventional display and illumination system described in Japanese Patent Application Laid-Open No. 2005-071870, the LED is optically connected to one end of optical fibers via the optical connector. Therefore, even in the conventional display and illumination system described in Japanese Patent Application Laid-Open No. 2005-071870, for accurately and effectively guiding light from the light source (LED) to the optical fibers, the location relationship (optical axis) of the light source, the optical connector, and one end of optical fibers must be accurately aligned. So there is a similar problem to that described in the abovementioned Japanese Patent Application Laid-Open No. 2009-265960.

In order to solve such problems, it is an object of the present invention to obtain a display and illumination system to guide light from a light source to a display unit or an illumination unit of a simple configuration installed remotely from the light source using optical fibers, wherein when the light source is optically connected to optical fibers during the replacement of the light source, one can easily carry out the adjustment of location relationship between the light source and optical fibers to accurately and efficiently guide light from the light source to the optical fibers.

According to one aspect of the present invention, a display and illumination system includes a light source section accommodating a light source, an optical fiber for transmitting light from said light source, a display illumination unit radiating light transmitted by said optical fiber, a light source module installed in said light source section, accommodating said light source, and optically connected to said optical fiber, a plug electrode installed in said light source module, and for supplying electric power to said light source, a convex portion formed on a first side of said light source module, engaged to said optical fiber, and for extracting light from said light source and a concave portion formed on the other side opposite to the first side of said light source module, and used for pushing said convex portion to said optical fibers under a constant force.

Other and further objects, features and advantages of the invention will appear more fully from the following description.

DETAILED DESCRIPTION OF THE PREFERRED EMBODIMENT

First Embodiment

Figure 1:
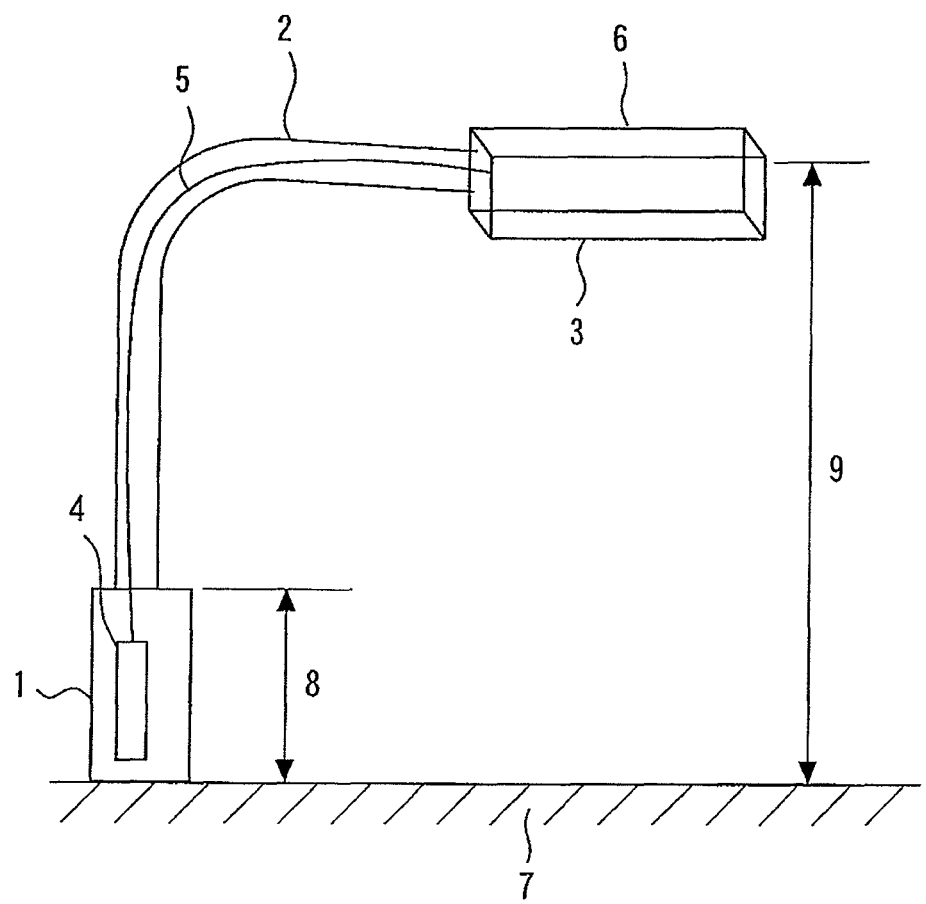
FIG. 1 is a diagram schematically showing the entire configuration of a display and illumination system according to a first embodiment of the present invention.

FIGS. 1 to 4 relate to a first embodiment of the present invention. In FIG. 1, the numeral 1 denotes a light source section 1 wherein a light source of a display and illumination system is enclosed. From the light source section 1, a support pillar 2 is upwardly installed. On the upper-end side of the support pillar 2, a display unit or an illumination unit 3 from which light from the light source section 1 is emitted is provided. In the light source section 1, a light source module 4 constituting the light source of the display and illumination system is incorporated.

In the support pillar 2, optical fibers 5 that communicate light from the light source module 4 of the light source section 1 to the display unit or the illumination unit 3 are provided. An end of the optical fibers 5 is optically connected to the light source module 4 of the light source section 1. The optical fibers 5 pass through the support pillar 2, and the other end of the optical fibers 5 is connected to the display unit or the illumination unit 3. In the display unit or the illumination unit 3, a diffuser plate 6 to which a fluorescent substance for diffusing the light from the light source section 1 output from the other end of the optical fibers 5 is applied is fitted.

Here, the light source section 1 is installed on the ground surface or floor surface 7 directly or via the base or the like. At this time, the height (h) 8 of the light source section from the ground surface or the floor surface is made to be a height to which human hands can reach (specifically, for example, a height of 1.5 m or less). As described above, the display unit or illumination unit 3 is supported by the support pillar 2 connected to the light source section 1. At this time, the height (H) 9 of the display unit or the illumination unit from the ground surface or the floor surface is made to be a height to which human hands cannot reach (specifically, for example, a height of 1.5 m or more).

Figure 2:
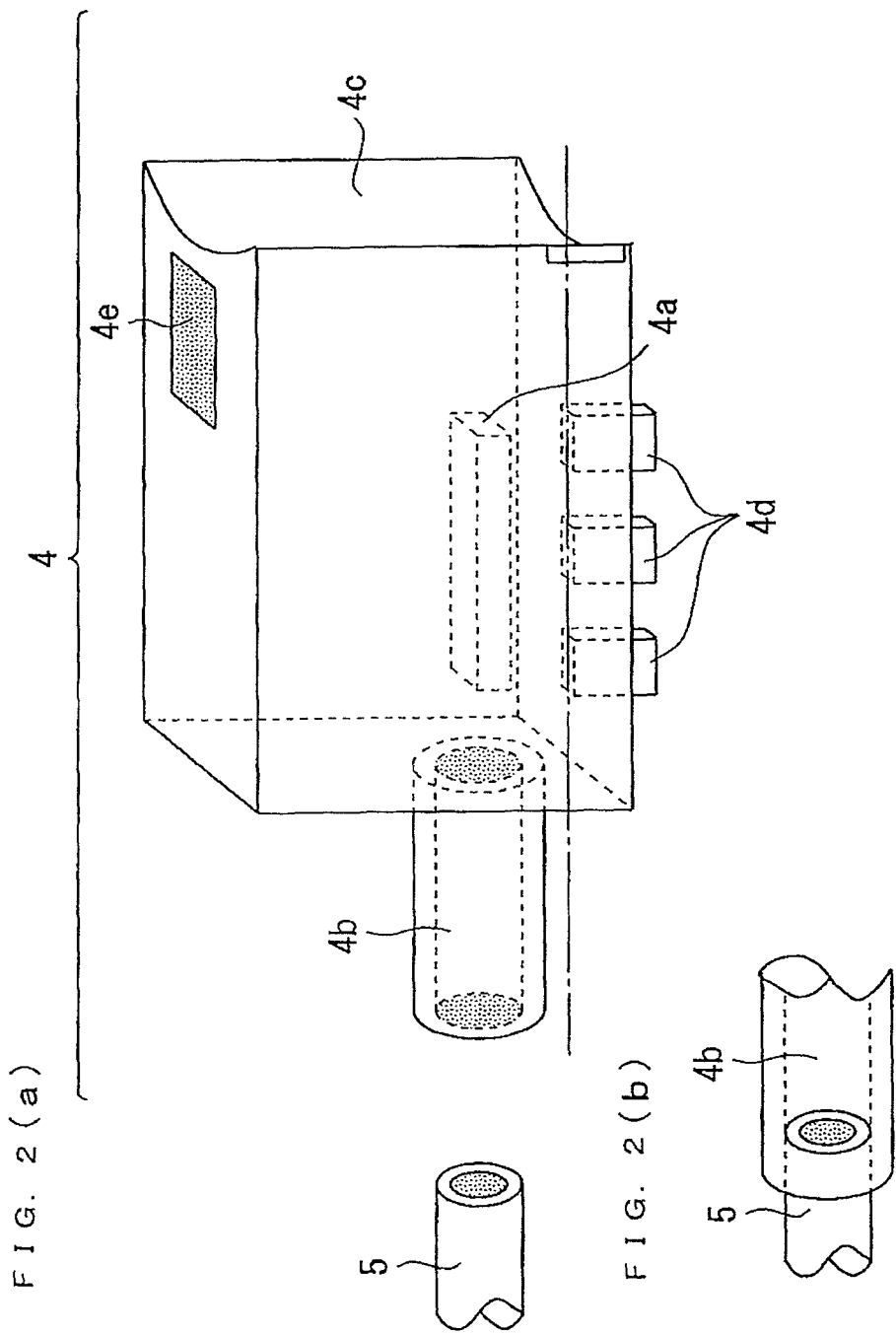
FIG. 2 is a perspective view showing a light source module assembled in a light source section of a display and illumination system section according to the first embodiment of the present invention.

FIG. 2 shows the light source module 4 incorporated in the light source section 1.

As described above, the light source module 4 composing the light source of the display and illumination system is incorporated in the light source section 1. The shape of the light source module 4 is substantially a rectangular parallelepiped. In the light source module 4, a laser diode 4a to output laser beams is incorporated. The laser diode 4a, which is the light source, is assembled in the package. A convex portion 4b is formed in a side surface of the laser beam outputting side (the left side surface in FIG. 2 (a)) of the laser diode 4a in the light source module 4. The convex portion 4b has a substantially cylindrical form, and is formed so that the laser beams outputted from the laser diode 4a pass through the cylinder of the convex portion 4b. The inner diameter of the cylinder of the convex portion 4b is formed to be substantially the same as or slightly larger than the outer diameter of the optical fiber 5, so that the optical fibers 5 can be engaged to the convex portion 4b as shown in FIG. 2 (b).

Here, as the core diameter, which is the diameter of the core section of the optical fiber 5 (the section to propagate light from the optical fibers 5), the optical fibers 5 having a larger core diameter than the diameter of laser beams outputted from the laser diode 4a are used. Then, as described above, the light source module 4 is optically connected to the optical fibers 5 by engaging the convex portion 4b to the optical fiber 5. In the state wherein the light source module 4 is optically connected to the optical fibers 5, laser beams outputted from the laser diode 4a of the light source module 4 are inputted into the core section on one end of the optical fibers 5 from the convex portion 4b. The laser beams inputted into the one end of the optical fibers 5 are guided by the optical fibers 5, and radiated to the diffuser plate 6 of the display unit or the illumination unit 3 from the other end of the optical fibers 5. Then, the light is diffused by the diffuser plate 6, and radiated from the display unit or the illumination unit 3.

A concave portion 4c is formed on the other side (the right side in FIG. 2 (a)) opposite to the side on which the convex portion 4b of the light source module 4 is formed. Also in the light source module 4, male plug electrodes 4d used for supplying electric power to the laser diode 4a are formed on the surface between one side where the convex portion 4b is formed and the other side where a concave portion 4c is formed (the lower surface in FIG. 2 (a)). A window portion 4e for observing the light emitting state of the laser diode 4a is formed on the surface opposite to the surface where the plug electrodes 4d of the light source module 4 (the upper surface in FIG. 2 (a)).

As described above, the laser diode 4a and the convex portion 4b are arranged so that laser beams outputted from the laser diode 4a pass through the cylinder of the convex portion 4b. At this time, the optical axis of laser beams from the laser diode 4a is designed to agree with the center axis of the cylinder of the convex portion 4b. Therefore, when the convex portion 4b is engaged to the optical fibers 5 to optically connect the light source module 4 to optical fibers 5, the three axes of the optical axis of the laser diode 4a, the center axis of the convex portion 4b, and the center axis of the optical fibers 5 become coincident.

The shape of the concave surface of the concave portion 4c is formed so that the center of the concave surface, which is the deepest valley portion of the concave shape, is located on the optical axis of the laser diode 4a and the center axis of the convex portion 4b. Furthermore, the plug electrode 4d is formed so that a plate-shape body has a substantially rectangular shape when viewed planarly, and the long side of the rectangle is parallel to the line formed by the optical axis of the laser diode 4a and the center axis of the convex portion 4b, that is, the line connecting the center of the convex portion 4b and the center of the concave portion 4c.

Figure 3:
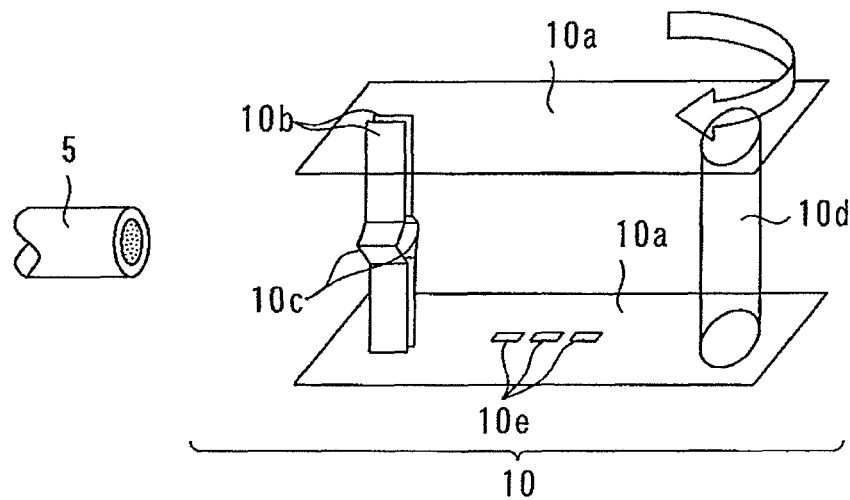
FIG. 3 is a perspective view showing a holder for holding the light source module in the light source section of the display and illumination system according to the first embodiment of the present invention.
Figure 4:
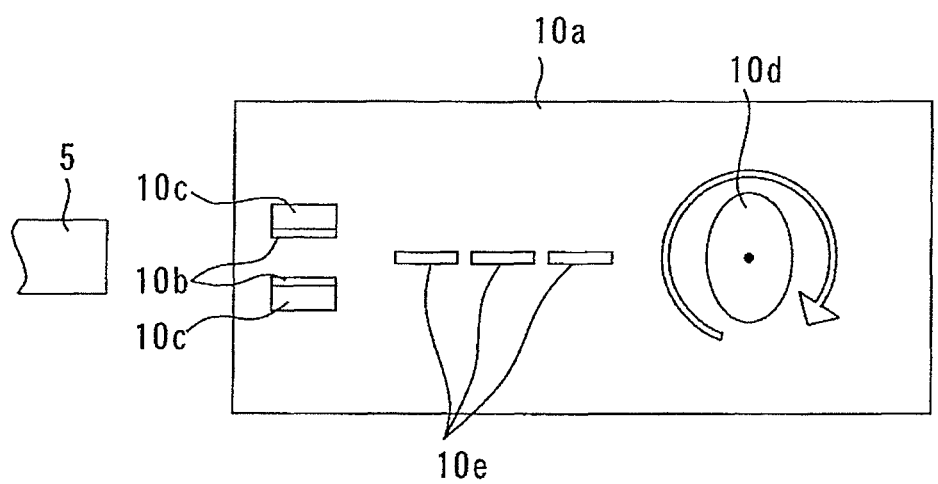
FIG. 4 is a plan view showing a holder for holding the light source module in the light source section of the display and illumination system according to the first embodiment of the present invention.

The light source module 4 is held by a holder 10 formed in the light source section 1, and optically connected to the optical fiber 5 in the light source section 1. The configuration of the holder 10 is shown in FIGS. 3 and 4. The holder 10 has holder bodies 10a composed of a pair of plate-like bodies formed on the upper side and the lower side of the light source module 4. Between this pair of holder bodies 10a, a pair of leaf springs 10b and the pressing elliptical cylinder 10d is arranged.

The leaf springs 10b are placed on the optical fiber 5 side, which is the convex portion 4b side of the light source module 4 held by the holder 10. On the substantially center portion of each of a pair of leaf springs 10b, bent portions 10c for determining the location to pinch the convex portion 4b of the light source module 4 are formed. Here, each of the bent portions 10c forms a substantially triangular area, and these bent portions 10c are placed so that their bent portions face one another. The convex portion 4b of the light source module 4 is placed in the void formed by bent portions 10c, and is pinched from both sides by the leaf springs 10b. Thus, the convex portion 4b of the light source module 4 is fixed in an appropriate location where the center axis of the convex portion 4b is aligned with the center axis of the optical fibers 5. Here, although each of the bent portions 10c forms a substantially triangular area, those portions may be semicircular, having substantially the same diameter as the outer diameter of the convex portion 4b of the light source module 4.

The pressing elliptical cylinder 10d is placed on the opposite side of the optical fibers 5, which is the concave portion 4c side of the light source module 4 held by the holder 10. The role of the pressing elliptical cylinder 10d is to press the light source module 4 to the optical fiber 5 side under a constant force by engaging with the concave portion 4c of the light source module 4. The cross-sectional shape of the pressing elliptical cylinder 10d is elliptical, and rotatably fixed around the rotation axis passing through the center of the oval and along the height direction of the elliptical cylinder.

Female sockets 10e engaged to the plug electrode 4d of the light source module 4 is also installed in the holder body 10a. In the state wherein the light source module 4 is incorporated in the holder 10, the sockets 10e are placed in the location facing to the plug electrode 4d of the light source module 4. For engaging with the plug electrode 4d of the light source module 4, the sockets 10e are formed as substantially rectangular holes when viewed planarly. At this time, the long sides of the rectangles when viewed planarly are formed to be parallel to the optical axis of the laser diode 4a and the center axis of the convex portion. 4b, that is, the line connecting the center of the convex portion 4b and the center of the concave portion 4c.

The long-side length of a rectangular when the sockets 10e are viewed planarly is made longer than the long-side length of the corresponding plug electrodes 4d. Therefore, when the light source module 4 is incorporated to the holder 10, in the state wherein the plug electrodes 4d are engaged with the sockets 10e, the light source module 4 can be transferred in parallel to the optical axis of the laser diode 4a and the center axis of the convex portion 4b (the line connecting the center of the convex portion 4b and the center of the concave portion 4c).

The installation of the light source, which is the light source module 4, in the light source section 1 of the display and illumination system thus composed, is carried out as follows.

First, the convex portion 4b of the light source module 4 is passed through the dent portion 10c of the leaf spring 10b possessed by the holder 10 of the light source section 1. Next, the plug electrodes 4d of the light source module 4 are inserted to the sockets 10e of the holder 10.

Then, from the short radius side of the oval, which is the cross-section of the pressing elliptical cylinder 10d, faces to the concave portion 4c of the light source module 4, the pressing elliptical cylinder 10d is rotated by 90 degrees around the rotation axis to be the state wherein the long radius side of the oval faces to the concave portion 4c. Then, the light source module 4 moves, with respect to the holder 10, in parallel with the optical axis of the laser diode 4a and the center axis of the convex portion 4b (the line connecting the center of the convex portion 4b and the center of the concave portion 4c). Thus, the optical fibers 5 are inserted in the convex portion 4b of the light source module 4. Then, the light source module 4 and the optical fibers 5 are pressed by the pressing elliptical cylinder 10d in the state optically connected under a constant force. In order to facilitate the rotation of the pressing elliptical cylinder 10d, it is preferable to form a knob on the upper surface of the pressing elliptical cylinder 10d. The knob is effective when formed along the long-radius direction of the oval.

Here, the moving distance of the light source module 4 when the pressing elliptical cylinder 10d is rotated is difference between the long radius and the short radius of the oval of the pressing elliptical cylinder 10d. Therefore, by adjusting the dimensions of the long radius and the short radius of the pressing elliptical cylinder 10d, the distance for inserting the optical fibers 5 into the convex portion 4b can be optimally adjusted. In addition, by inserting the optical fibers 5 into the convex portion 4b by rotating the pressing elliptical cylinder 10d, a constant inserting distance can be obtained at all times. Furthermore, the end portion of the convex portion 4b for inserting the optical fibers 5 can be tapered to smoothly insert the optical fibers 5 into the convex portion 4b.

If the light source module 4 is removed from the holder 10 of the light source section 1 for the reason of the abnormality of the laser diode 4a, the above-described procedures can be reversely carried out. Specifically, the pressing elliptical cylinder 10d is rotated to be the state wherein the long radius side facing to the concave portion 4c of the light source module 4 is made to be the sort radius side facing to them. Next, the light source module 4 is moved to the opposite side of the optical fibers 5 to remove the engaging between the optical fibers 5 and convex portion 4b. Then, the plug electrodes 4d are removed from the sockets 10e, and the convex portion 4b is removed from the leaf springs 10b.

Here, for facilitating the attachment and removal of the plug electrode 4d to and from the socket 10e, the socket 10e can be push opened corresponding to the rotation of the pressing elliptical cylinder 10d. In order to realize this, for example, small elliptical cylinders similar to the pressing elliptical cylinder 10d are aligned in the socket 10e. Then, the small elliptical cylinders are constituted to rotate in conjunction with the pressing elliptical cylinder 10d.

Also to move the light source module 4 to the opposite side of the optical fibers 5 when the pressing elliptical cylinder 10d is rotated without human power, a spring can be placed between the convex portion 4b of the light source module 4 and the leaf spring 10b of the holder 10. In this case, it is considered that the spring is placed so that the spring is placed around the convex portion 4b, and an end of the spring contacts the side of the light source module 4 and the other end of the spring contacts the leaf spring 10b.

Furthermore, in order to facilitate the attachment and detachment of the light source module 4 to and from the holder 10, for example, a handle-like protrusion may be formed on the surface where the window portion 4e of the light source module 4 is formed.

Also as described above, a window portion 4e for confirming the light-emitting state of the laser diode 4a is formed in the light source module 4. Here, it can be constituted so as to confirm the light-emitting state of the laser diode 4a by placing a fluorescent substance in the opposite side of the laser beam outputting side of the laser diode 4a in the light source module 4, exciting the fluorescent substance by a part of laser beams outputted from the laser diode 4a to emit light, and confirming the light-emitting state of the fluorescent substance from the window portion 4e. It can also be constituted so as to confirm the light-emitting state of the laser diode 4a by placing a mirror body in place of the fluorescent substance, applying a fluorescent substance to the window portion 4e, and making the fluorescent substance of the window portion 4e emit light by reflecting a part of the laser beams outputted from the laser diode 4a with the mirror body.

Here, the pressing member engaged to the concave portion 4c of the light source module 4 is made to be a pressing elliptical cylinder 10d having the elliptical cross-section. However, the shape of the pressing member is not limited to the elliptical cylinder. Specifically, the cross-sectional shape may have the shape wherein the distance from the rotation axis is smoothly changed, for example, (the external part of) a helical shape.

Furthermore, a dent may be formed along the center of the concave portion 4c of the light source module 4. The dent is formed so that the pressing member (pressing elliptical cylinder 10d) is engaged in the state wherein the light source module 4 is pressed (for example, in the case of the pressing elliptical cylinder 10d, the long radius of the oval is engaged). It is convenient since the pressing member is engaged to the dent at the location where it adequately presses the light source module 4, and the rotation stops.

Also here, the plug electrodes 4d of the light source module 4 and the sockets 10e of the holder 10 are placed in one line. However, the configuration is not limited to one line, but can be more than one line if they are parallel to the optical axis of the laser diodes 4a and the center axis of the convex portion 4b (the line connecting the center of the convex portion 4b and the center of the concave portion 4c).

In the display and illumination system constituted as described above, the light source section accommodating the laser diode, which is the light source, can be placed remotely from the display unit or the illumination unit outputting light from the light source section. Therefore, even if the display unit or the illumination unit is placed on a high place, the light source section can be placed at a relatively low location to which human hands can reach. Therefore, the location to place the display unit or the illumination unit can be freely determined without considering the limitation of the replacement of the light source. On the other hand, since the light source section is placed at a relatively low place, the light source can be easily replaced.

By making the light source module including laser diodes and the holder be made as the above-described configuration, the attachment and the detachment of the light source module can be easily and surely carried out. By using laser diodes having higher electrical/optical conversion efficiency than the lamp, fluorescent light, or LED, energy can be saved. In addition, by the use of laser diodes, light propagation properties by optical fibers are excellent. Also, by the use of optical fibers for the transmission of light from the light source section to the display unit or the illumination unit, the weight can be reduced in comparison to the case wherein the light source is installed in the display unit or the illumination unit, and the weight can be reduced in comparison with electric-power supply with an electric wire.

Although the above-described description assumes a traffic signal or a street light as the display and illumination system, the constitution of the light source module and the holder in the light source section described here can also be applied to other optical apparatuses using the laser diode as the light source, such as a projector.

Second Embodiment

Figure 5:
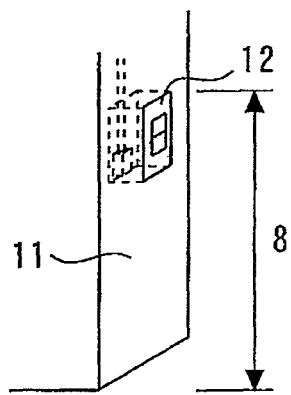
FIG. 5 is a perspective view showing the switch box installed section in a facility such as a building wherein a display and illumination system according to a second embodiment of the present invention is installed.
Figure 6:
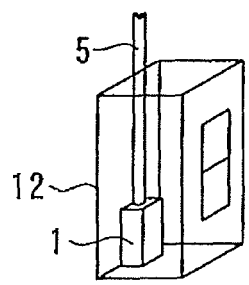
FIG. 6 is a perspective view showing the inside of a switch box in a facility such as a building wherein a display and illumination system according to the second embodiment of the present invention is installed.

FIGS. 5 and 6 relate to a second embodiment of the present invention.

The second embodiment described here is a specific example wherein the configuration of the first embodiment described above is applied to a display and illumination system installed in the buildings of the facilities, such as office buildings and hotels. Specifically, as shown in FIG. 5, a switch box 12 having switches on its front face for switching on/off the display and illumination system is installed on the post or the wall 11 of a building, such as an office building, where a display and illumination system is installed.

In the switch box 12, a light source section 1 is accommodated. The configuration of the light source section 1 is similar to the light source section 1 of the first embodiment described above. That is, a light source module including a laser diode and a holder are formed in the light source section 1. From the light source section 1, optical fibers 5 set in a fiber protecting tube extend, and the optical fibers 5 are connected to the display unit or the illumination unit placed on the ceiling or the wall in the building (FIG. 6). The height (h) 8 where the switch box 12 is installed is made to be a height to which human hands can reach (specifically, for example, a height of 1.5 m or less).

Here, in the present embodiment, a plurality of display units or illumination units 3 can be optically connected to one light source section 1. In other words, a plurality of sets of optical fibers 5 extending from a plurality of display units or illumination units 3 are bundled and connected to one light source section 1.

Since other components are similar or identical to the components in the first embodiment, the detailed description thereof will be omitted. The display and illumination system thus configured can also accomplish effects similar to those of the first embodiment. By using a laser diode as the light source, the size of the light source section can be reduced, and the light source section can also be easily incorporated in the switch box.

Third Embodiment

Figure 7:
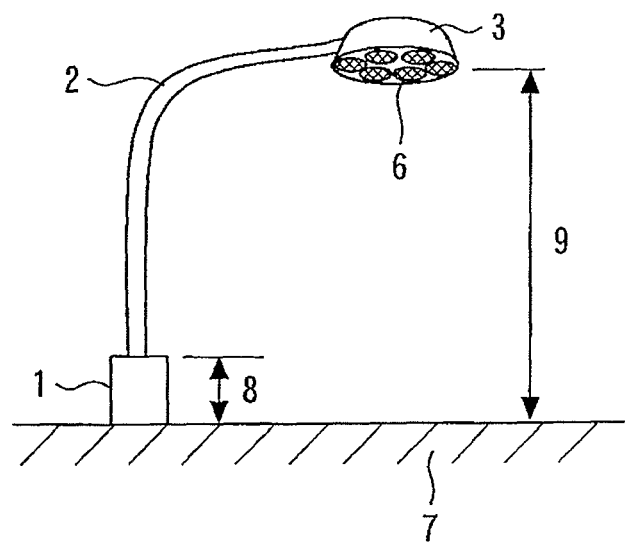
FIG. 7 is a diagram schematically showing the entire configuration of a display and illumination system according to a third embodiment of the present invention.
Figure 8A:
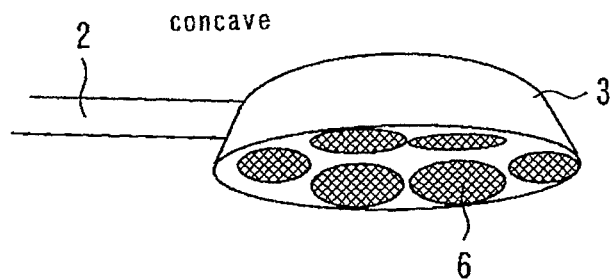
FIG. 8 is an enlarged view showing the illumination unit of a display and illumination system according to the third embodiment of the present invention.
Figure 8B:
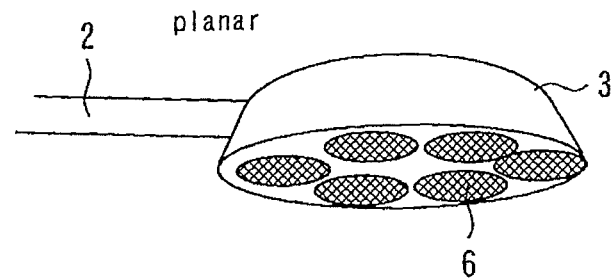

FIGS. 7 and 8 relate to a third embodiment of the present invention.

The third embodiment described here is a specific example wherein the configuration of the first embodiment described above is applied to a display and illumination system for illuminating the road surface. That is, by making the shape of the diffuser plate 6 formed in the display unit or the illumination unit 3 supported in a high place by the support pillar 2 be concave (FIG. 8A) or planar (FIG. 8B), a desired illumination range can be obtained. Alternatively, the shape of the diffuser plate 6 of the display unit or the illumination unit 3 can be made to be partially concavo-convex. The optical fibers 5 are accommodated in a fiber protecting tube.

Since other components are similar or identical to the components of the first embodiment, the detailed description thereof will be omitted. The display and illumination system thus configured can also accomplish effects similar to those of the first embodiment.

Fourth Embodiment

Figure 9:
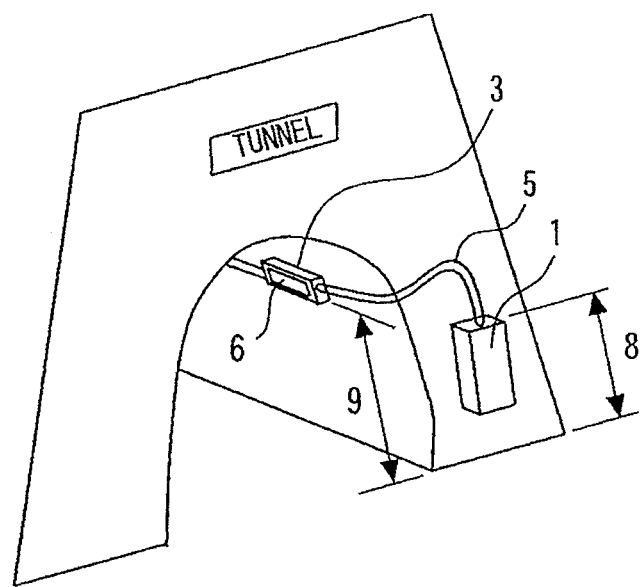
FIG. 9 is a diagram showing the configuration of a display and illumination system according to a fourth embodiment of the present invention.

FIG. 9 relates to a fourth embodiment of the present invention.

The fourth embodiment described here is a specific example wherein the configuration of the first embodiment described above is applied to a display and illumination system for illuminating the inside of a tunnel. That is, in the present embodiment, for example, the display unit or illumination unit 3 is located in the tunnel of a highway or a general road. To the diffuser plate 6 of the display unit or illumination unit 3, a fluorescent substance is applied. As the fluorescent substance, a white or yellow emitting material (specifically, the color of the flame reaction of sodium) is used.

The light source section 1 accommodating the light source module that includes the laser diode, which is a light source, and the holder is placed on the locations of the height (h) 8 to which human hands can reach at the inlet and the outlet of the tunnel. On the other hand, the height (H) 9 where the display unit or the illumination unit 3 is installed is the height to which human hands cannot reach. The optical fibers 5 incorporated in the fiber protecting tube extend from the light source section 1 to each display unit or illumination unit 3 in the tunnel. When the distance of the tunnel is longer than a prescribed length, the light source sections 1 can be installed at not only the inlet and the outlet of the tunnel, but also in the tunnel at predetermined constant intervals.

Since other components are similar or identical to the components of the first embodiment, the detailed description thereof will be omitted. The display and illumination system thus configured can also accomplish effects similar to those of the first embodiment.

Fifth Embodiment

Figure 10:
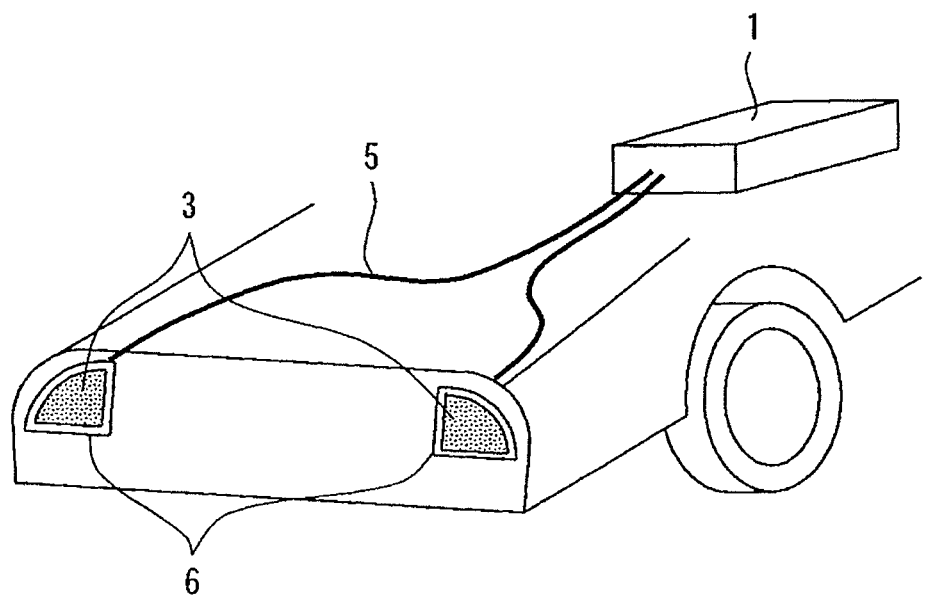
FIG. 10 is a diagram showing the configuration of a display and illumination system according to a fifth embodiment of the present invention.
Figure 11:
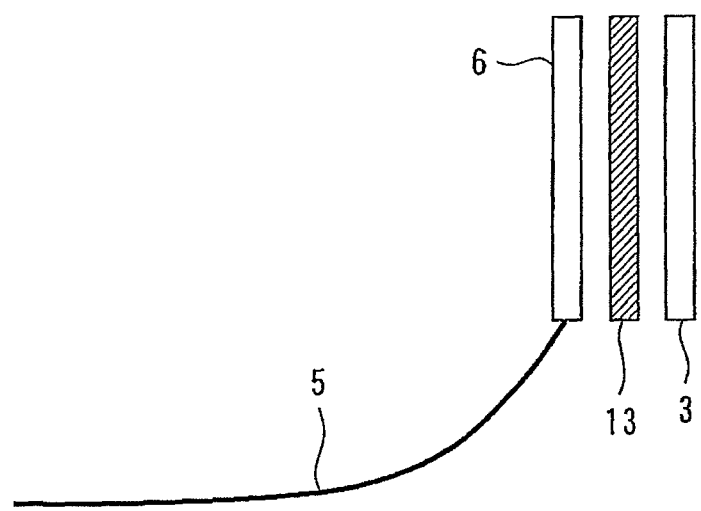
FIG. 11 is a diagram showing the configuration of the display and illumination unit of a display and illumination system according to the fifth embodiment of the present invention.

FIGS. 10 and 11 relate to a fifth embodiment of the present invention.

The fifth embodiment described here is a specific example wherein the configuration of the first embodiment described above is applied to a display and illumination system of the head light (front lamp) and the like installed in vehicles, such as motor vehicles. Specifically, in the present embodiment, the display unit or the illumination unit 3 constitutes, for example, the head lights, tail lights (rear lamps, brake lamps) or flashers (blinkers) and the like of motor vehicles. For the fluorescent substances used on the diffuser plate 6 of these display units or illumination units 3, substances suitable to the place where the display units or the illumination units 3 are used can be used. Specifically, for example, fluorescent substances that emit white, red, and orange colors for the head lights, tail lights, and flashers, respectively. Alternatively, as shown in FIG. 11, a colored filter 13 of a color suitable to the place where the display unit or illumination unit 3 is used can be inserted between the diffuser plate 6 and the surface of the display unit or the illumination unit 3.

The light source section 1 including the light source module incorporating the laser diode, which is the light source and the holder, is installed in the location facilitated for maintenance, such as the fuse box inside the motor vehicle body. Of course, the location where the light source section 1 is installed is not limited to the inside of the fuse box as long as the maintenance is easy, but can be the location facilitated for maintenance, such as the vicinity of the place where travelers ride inside the body, and a light source box can be installed separately from the fuse box. The light source section 1 is connected to each display unit or illumination unit 3 by the optical fibers 5.

Since other components are similar or identical to the components of the first embodiment, the detailed description thereof will be omitted. The display and illumination system thus composed can also accomplish effects similar to those of the first embodiment. Specifically, without breaking down the lamp house of the head lights and the like, not only the replacement of the light source, but also the attachment and detachment of the light source module can be easily and correctly carried out.

What is claimed is:

1. A display and illumination system comprising:
a light source section housing a light source module for producing light;
a holder having opposed first and second holder bodies and retaining said light source module in said light source section between said first and second holder bodies;
an optical fiber for transmitting the light produced by said light source module;
a display illumination unit receiving, through and away from said optical fiber, and radiating the light produced by said light source module, wherein
said light source module includes
opposed first and second sides transverse to said first and second holder bodies, wherein said second side has a concave surface that has a concave surface axis which is transverse to the first and second holder bodies,
a light source disposed within said light source module and between said first and second holder bodies and said first and second sides, wherein said light source has an optical axis along which the light is emitted,
a tubular portion projecting from said first side, having a central axis, and engaging said optical fiber so that the optical axis of said light source is aligned with the central axis of said tubular portion,
a plug electrode for supplying electrical power to said light source, and
a pressing member transverse to said first and second holder bodies, engaging, and rotatable about an axis of rotation that is transverse to said first and second holder bodies, wherein said pressing member has an exterior surface which, in a cross-section transverse to the axis of rotation, varies smoothly in separation from the axis of rotation, for engaging and disengaging said concave surface of said second side and urging said tubular portion toward and away from said optical fiber, with the concave surface axis of said second surface intersecting the optical axis of said light source and the central axis of said tubular portion.

2. The display and illumination system according to claim 1, wherein said plug electrode is a plate-like body having a substantially rectangular shape, with longer sides and shorter sides, when viewed in a plane parallel to said first and second holder bodies, and is located between said tubular portion and said concave surface of said second side so that the longer sides are parallel to a line connecting the central axis of said tubular portion to the concave surface axis of said concave surface.

3. The display and illumination system according to claim 2, comprising a window section, installed opposite said plug electrode of said light source module, for observing whether said light source is emitting light.

4. The display and illumination system according to claim 1, wherein said light source is a laser diode.

5. The display and illumination system according to claim 1, wherein said holder includes pinching means pinching said tubular portion of said light source module in a prescribed position.

6. The display and illumination system according to claim 5, wherein
said pinching means comprises a pair of leaf springs pinching said tubular portion of said light source module, and
said leaf springs include bent portions for aligning said tubular portion in said leaf springs.

7. The display and illumination system according to claim 1, wherein said pressing member has an elliptical cross-section.

8. The display and illumination system according to claim 1, wherein
said display illumination unit is installed in a building, and
said light source section has a switch for turning said display and illumination system on and off, and a switch box installed in the building.

9. The display and illumination system according to claim 1, including a diffuser plate installed in said display illumination unit, wherein said diffuser plate is concave, planar, or partially concavo-convex, depending on an area to be illuminated.

10. The display and illumination system according to claim 1, wherein
said light source section is installed at an inlet and an outlet of a tunnel, and
said display illumination unit is installed in the tunnel, and including a diffuser plate installed in said display illumination unit and a fluorescent substance, generating white light or light of the color of a flame reaction of sodium, on said diffuser plate.

11. The display and illumination system according to claim 1, wherein
said light source is installed inside a vehicle,
said display illumination unit is installed in the vehicle, and including a diffuser plate installed in said display illumination unit, and a fluorescent substance generating light of a prescribed color corresponding to the location of said display illumination unit, applied to said diffuser plate.

* * * * *